United States Patent [19]

Mikami et al.

[11] Patent Number: 4,666,236

[45] Date of Patent: May 19, 1987

[54] OPTICAL COUPLING DEVICE AND METHOD OF PRODUCING SAME

[75] Inventors: Kazuo Mikami, Kyoto; Taro Watanabe, Takatsuki, both of Japan

[73] Assignee: Omron Tateisi Electronics Co., Kyoto, Japan

[21] Appl. No.: 521,644

[22] Filed: Aug. 9, 1983

[30] Foreign Application Priority Data

| Aug. 10, 1982 [JP] | Japan | 57-138771 |
| Sep. 30, 1982 [JP] | Japan | 57-172887 |
| Sep. 30, 1982 [JP] | Japan | 57-172886 |
| Oct. 1, 1982 [JP] | Japan | 57-173609 |

[51] Int. Cl.$^4$ .............................................. G02B 6/24
[52] U.S. Cl. ............................. 350/96.15; 350/96.17; 250/227
[58] Field of Search ...................... 350/96.15, 96.17

[56] References Cited

FOREIGN PATENT DOCUMENTS

| 0980451 | 12/1975 | Canada | 350/96.17 |
| 0007948 | 1/1979 | Japan | 350/96.17 |
| 0085014 | 5/1982 | Japan | 350/96.15 |
| 0093590 | 6/1982 | Japan | 350/96.17 |
| 1437067 | 5/1976 | United Kingdom | 350/96.17 |

*Primary Examiner*—William L. Sikes
*Assistant Examiner*—Akm E. Ullah
*Attorney, Agent, or Firm*—Cushman, Darby & Cushman

[57] ABSTRACT

An optical coupling device is prepared with use of an optical medium containing a monomer which is polymerizable when irradiated with light to give a polymer having a higher refractive index than the monomer. The two elements to be coupled optically are at least partly embedded in the optical medium, and an optical coupling path partly interconnecting the two elements is formed by the photopolymerization of the monomer which is accelerated by light propagating from at least one of the elements toward the other element. Thus the photopolymerization of the monomer forms in the portion of the optical coupling path a polymer which has a higher refractive index than the surrounding portion and which therefore provides an optical waveguide of the step index type.

13 Claims, 10 Drawing Figures

OPTICAL COUPLING DEVICE AND METHOD OF PRODUCING SAME

BACKGROUND OF THE INVENTION

The present invention relates to optical coupling devices for connecting an optical fiber to another optical fiber, for connecting an optical fiber to a light-emitting element, photoconductive element or like semiconductor, and for connecting an optical fiber or a semiconductor element to a slab-type optical waveguide path formed on a substrate so that light can be propagated between the two members connected together. The invention also relates to a method of fabricating such devices.

Two optical elements are optically connected together usually by holding them in contact with each other at their surfaces to be coupled together, with their optical axes in alignment, and fixing the elements in place with an adhesive, or by spacing the two elements apart by a small clearance and filling the clearance with a transparent resin. However, such methods generally involve extreme difficulty in accurately aligning the optical axes of the two elements to be coupled together and are low in coupling efficiency. Further because heat-resistant adhesives are almost unavailable, the use of the adhesive entails the problem that when the optically coupled elements are used at high temperatures, the adhesive usually deteriorates early, permitting misalignment of the optical axes or resulting in a lower coupling efficiency. The device wherein resin is used for coupling has the drawback that the resin is expanded or contracted by changes in temperature to create variations in coupling efficiency.

SUMMARY OF THE INVENTION

The main object of the present invention is to provide an optical coupling device which is very easy to fabricate, achieves a high coupling efficiency and retains optical coupling with good stability despite variations in ambient temperature, and a method of making the device.

The optical coupling device of the present invention is prepared with use of an optical medium containing a monomer which is polymerizable when irradiated with light to give a polymer having a higher refractive index than the monomer. The two elements to be coupled optically are at least partly embedded in the optical medium, and an optical coupling path interconnecting portions of the two elements is formed by the photopolymerization of the monomer which is accelerated by light propagating from at least one of the elements toward the other element. Thus the photopolymerization of the monomer forms in the portion of the optical coupling path a polymer which has a higher refractive index than the surrounding portion and which therefore provides an optical waveguide of the step index type.

Because the two elements are optically coupled by the optical coupling path having a higher refractive index than the surrounding portion, the device of the present invention has a high optical coupling efficiency which can be maintained with good stability despite variations in ambient temperature. Further because the optical coupling path is formed by polymerization which is effected by light emitted from one of the two elements to be coupled after the two elements have been at least partly embedded in the optical medium, there is no need to align the optical axes unlike the prior art.

Other features of the present invention will become apparent from the following description of embodiments with reference to the accompanying drawings.

DESCRIPTION OF THE PREFERRED EMBODIMENTS

Figure 1:
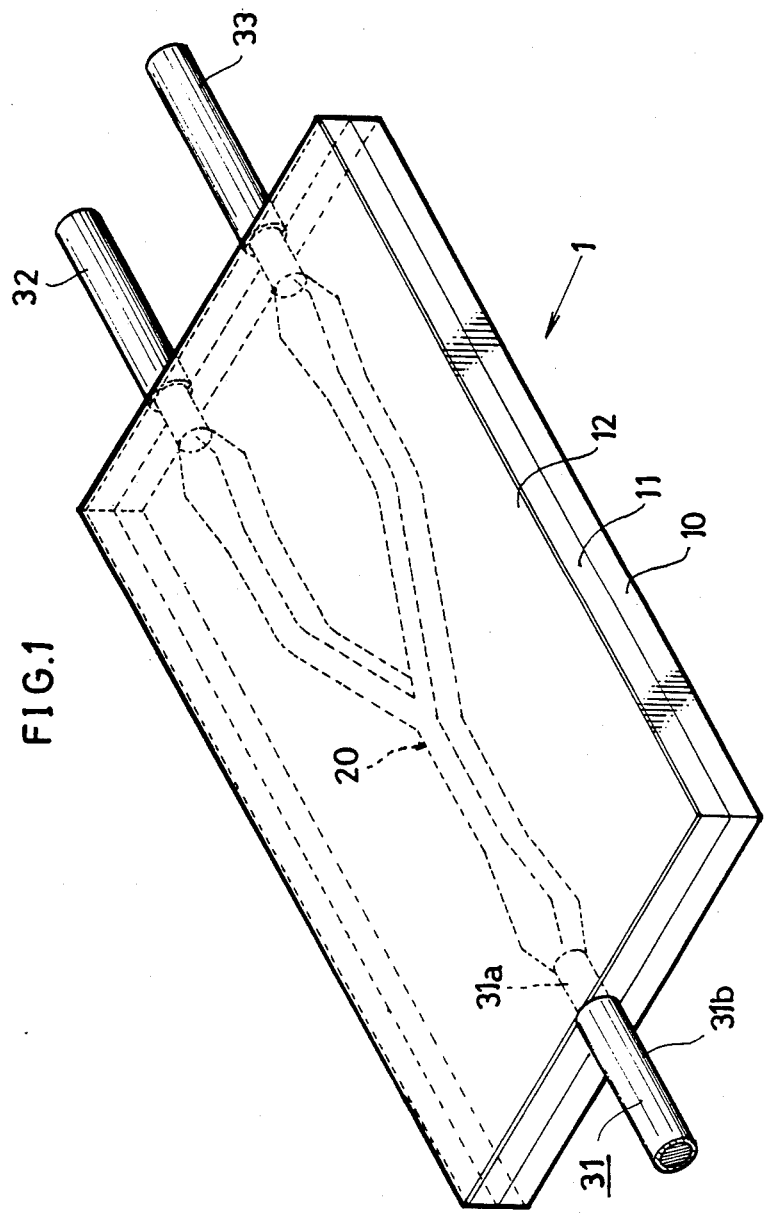
FIG. 1 is a perspective view showing an embodiment for optically coupling an optical fiber to other optical fibers or for coupling a slab-type optical waveguide to optical fibers.

FIG. 1 shows an optical coupling device 1 for optically coupling a single optical fiber 31 to two optical fibers 32 and 33. The device 1 is formed with a Y-shaped, wave dividing-wave coupling optical waveguide 20. In other words, the embodiment can be construed as having three optical coupling devices for coupling the three ends of the slab-type optical waveguide 20 to the optical fibers 31, 32 and 33 respectively.

The structure of the optical coupling device 1 can be understood from the following description of the method of fabricating the device. One end of the optical fiber 31 is placed on one end of a dielectric substrate 10, such as an acrylic resin substrate, having a low refractive index (i.e. a lower refractive index than the waveguide 20 to be formed later), and one end of each of the optical fibers 32 and 33 is placed on the other end of the substrate 10. The fiber ends are temporarily fixed in place by suitable means. An optical medium layer 11 containing a monomer is formed over the substrate 10 by casting, whereby the ends of the optical fibers 31 to 33 are almost embedded in the layer 11.

The optical fiber 31 comprises a core 31a and a clad layer 31b covering the core 31a. The end portion of the fiber 31 positioned in the optical medium layer 11 may have the clad layer 31b removed to expose the core 31a (provided that the layer 11 has a lower refractive index than the core 31a) as seen in FIG. 1, or may have the clad layer 31b remaining intact as indicated in broken line in FIG. 2. The same is true of the other optical fibers 32 and 33. The optical medium layer 11 has a thickness which is approximately equal to the diameter of the core of the optical fiber. For example, when the core of the fiber has a diameter of 200 μm, the layer 11 preferably has a thickness of 200 μm. The optical fiber has a protective covering (not shown) over the clad layer.

When irradiated with light, the monomer contained in the optical medium layer 11 is polymerized to form a polymer having a higher refractive index than the monomer. For example, the optical medium layer 11 is a mixture of 5.3 moles of acrylamide serving as the monomer, 100 g of ethylene glycol as a solvent, 55 mmoles of sodium toluene-sulfinate as a polymerization initiator, 20 mmoles of nitrophenylacetic acid as a fixing agent and 10 mmoles of hydroquinone as a diffusion preventing agent. The mixture is nearly in a solid state rather than a liquid state.

Figure 2:
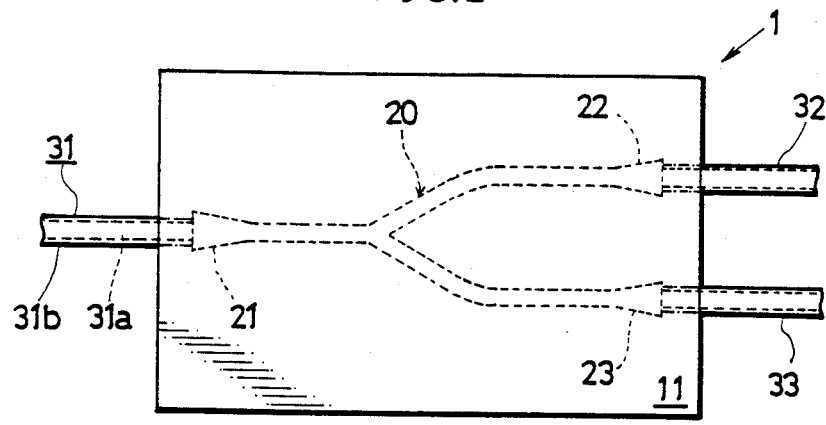
FIGS. 2 to 5 show the steps of preparing the optical coupling device of FIG. 1.

Next, a mask having an aperture in conformity with the shape of the optical waveguide 20 is placed over the optical medium layer 11, with the aperture positioned in the location where the waveguide 20 is to be formed, and the layer 11 is irradiated with a He-Ne laser beam from above. The irradiation with the light partly polymerizes the monomer in the portion of the layer 11 where the waveguide 20 is to be formed. Since the polymerized portion has a higher refractive index, the optical waveguide 20 of the step index type is formed in the optical medium layer 11 as shown in FIG. 2. For example, 1-mW He-Ne laser is used for irradiating the layer 11 for 7 minutes. Since the diffusion of irradiating light is prevented within the layer 11 by the diffusion preventing agent, the waveguide 20 can be formed with a distinct boundary.

The waveguide 20 of the present embodiment is a Y-shaped, wave dividing-wave coupling path. Preferably the width of the waveguide 20 is equal to the core diameter of the optical fibers except at the end portions 21 to 23 of the waveguide 20. Each of the end portions of the waveguide 20 has a width gradually increasing toward the extremity. Each extremity is in contact with the end of the corresponding optical fiber. The extremity may be spaced from the fiber end by a small clearance. The widthwise flaring angle of each of the end portions 21 to 23 of the waveguide 20 is preferably smaller than the largest angle through which light propagating through the guide 20 spreads out from the end portion.

Figure 3:
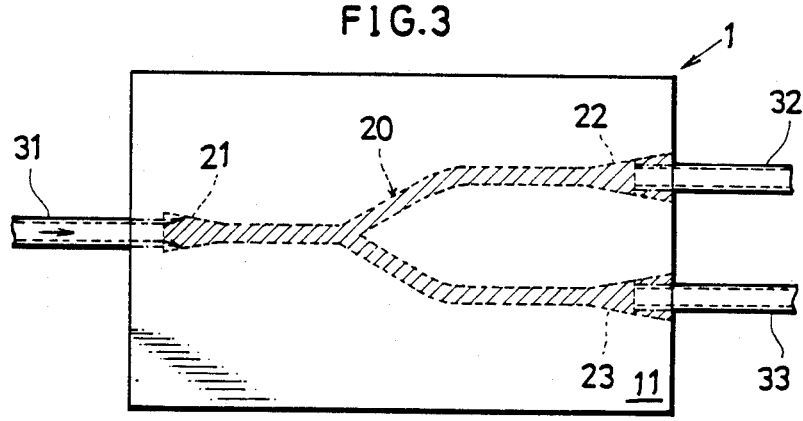

Further as seen in FIG. 3, a He-Ne laser beam is led into the other end of the optical fiber 31. The laser beam emerges from the inner end of the fiber 31, enters the waveguide 20, propagates through the waveguide 20 and dividedly advances into the two fibers 32 and 33. The laser light accelerates polymerization of the monomer in the waveguide 20 to give a further increased refractive index to the hatched portion. The flaring of the end portion 21 of the waveguide 20 serves to guide the emergent beam from the fiber 31 almost entirely into the waveguide 20. Some of the rays emerging from the other end portions 22 and 23 of the waveguide 20 leak without entering the optical fibers 32 and 33. Since the portion other than the waveguide 20 is inherently lower than the waveguide 20 in refractive index, the monomer polymerized by the leaking light and giving a slightly higher refractive index will cause no objection.

Figure 4:
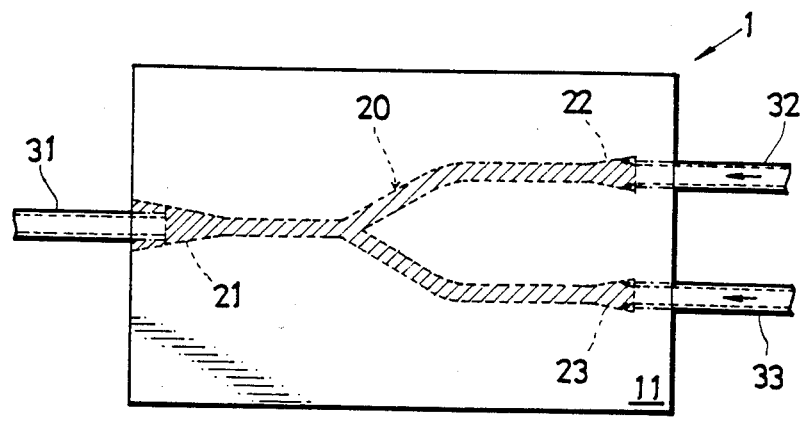

As shown in FIG. 4, He-Ne laser light is reversely introduced into the optical fibers 32 and 33 to cause the light to propagate through the waveguide 20, whereby the hatched portion is polymerized to a higher degree and thereby given a still increased refractive index. The He-Ne laser light is thus projected into the waveguide 20, for example, for 5 minutes in each of the above steps.

Figure 5:
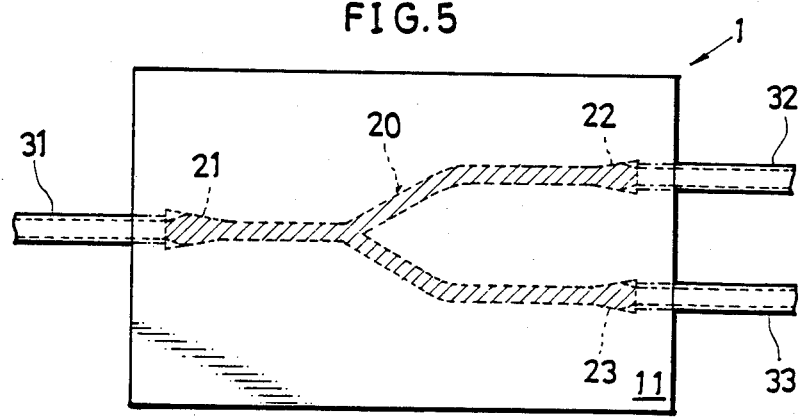

When the waveguide is thus irradiated with light three times in total, the portion thereof which has been exposed to light all the three times has the highest degree of polymerization and therefore the highest refractive index. This portion is shown in FIG. 5 as hatched. As will be apparent from this drawing, the part having the highest refractive index in each of the end portions 21 to 23 of the waveguide 20 has a progressively increasing width from the fiber core inwardly of the end portion, then has a decreasing width and further extends into the portion of uniform width of the waveguide 20. This indicates that at the junctions, the waveguide 20 is coupled to the optical fibers 31 to 33 with a very high efficiency. It is further advantageous that since the He-Ne laser beam is highest in its center and progressively decreases toward its periphery in intensity, the waveguide 20 has, especially at the end portions 21 to 23, the highest refractive index at the center to produce a light converging action. Thus the end portions 21 to 23 function as lenses having a distribution of refractive indexes to achieve a greatly improved coupling efficiency.

Finally the optical medium layer 11 is irradiated with ultraviolet rays in every direction and is thereby chemically stabilized. This fixing treatment is carried out, for example, by exposing the layer 11 to the light of a 2.5-mW high-pressure mercury lamp for 5 minutes. The product is then dried. Experiments have revealed that the product obtained after fixing and drying retains the optical waveguide 20, including the end portions 21 to 23, as and having a higher refractive index than the surrounding portions. The optical medium layer 11 is further coated with a layer 12, for example, of acrylic resin having a lower refractive index than the waveguide 20 (see FIG. 1). The resin layer 12 of low refractive index serves to prevent deposition of dust and staining and to prevent leakage of light propagating through the waveguide 20.

With the present embodiment, the optical waveguide 20 is formed with widthwise flaring end portions, and the light emerging from the optical fibers and incident on the flaring portions accelerates the polymerization of the portions through which the light has propagated to form optical coupling paths, so that high efficient optical coupling can be realized even when the waveguide 20 is optically out of alignment with the optical fibers 31 to 33. Further because the waveguide and the optical coupling paths between the waveguide and the optical fibers can be formed by a sequence of steps, the embodiment is easy to fabricate. If the waveguide 20 is optically in alignment with the optical fibers with high accuracy, the end portions 21 to 23 need not always be flared.

While the optical waveguide formed in the optical medium layer according to the foregoing embodiment is Y-shaped and has symmetric wave dividing-wave coupling paths, the waveguide can be shaped otherwise. For example, it may have asymmetric wave dividing-wave coupling paths or need not have any of such paths. The optical waveguide exemplified is 200 μm in both thickness and width and is suited for propagating multimode light, while these dimensions can be 5 to 10 μm for single mode use. Useful optical medium can be any of those containing a monomer which can be photopolymerized into a polymer having a higher refractive index than the monomer. For example, it is possible to use a solution of 1% of acrylamide and 5% of polymethyl methacrylate (PMA) in a solvent mixture of benzene and ethylene glycol.

Figure 6:
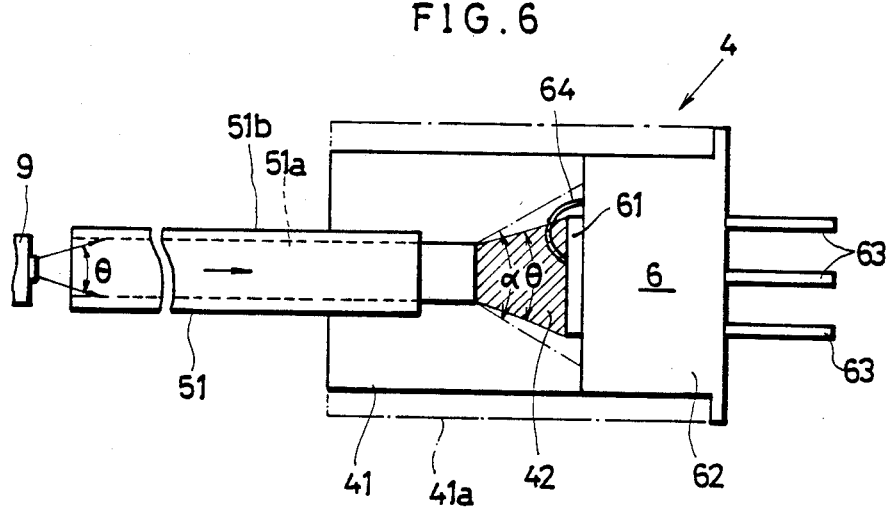
FIG. 6 shows an embodiment for optically coupling an optical fiber to a photoconductive element.

FIG. 6 shows another embodiment of the present invention. The optical coupling device 4 shown is adapted for optically coupling an optical fiber 51 to a photoconductive element 6, such as a phototransistor. The optical fiber 51 comprises a core 51a and a clad layer 51b, which is partly removed to expose the core 51a at one end of the fiber. The core 51a need not always be exposed. The photoconductive element 6 has a stem or mount 62, from the upper end of which a photoconductive chip 61 is slightly projected. Connecting pins 63 extends from the opposite side of the mount 62.

One end of the core 51a of the optical fiber 51 is opposed to the chip 61 of the photoconductive element 6 as spaced apart therefrom by a predetermined distance. The space is filled with an optical medium 41 which is the same as the one already stated, whereby the optical fiber 51 can be physically connected to the element 6. As indicated by a broken line 41a, the mount of the element 6 may be covered with the optical medium.

Next, light is projected from a He-Ne laser 9 into the other end of the optical fiber 51 to cause the light to emerge from one end of the fiber 51 against the photoconductive surface of the chip 61. The spreading angle $\theta$ of the emergent light is so determined that the light irradiates only the entire area of the circular photoconductive surface of the chip 61. The spreading angle $\theta$ is smaller than the largest spreading angle $\alpha$ of the light emerging from the optical fiber 51. When the photoconductive surface is square, the light is adapted to impinge substantially on the entire area of the surface. The irradiation with the He-Ne laser light is continued for 5 minutes. It is possible to use the light of a light-emitting diode instead of the He-Ne laser light.

Between one end of the fiber core 51a and the photoconductive surface of the chip 61, the portion of the optical medium 41 through which the light has passed has its monomer photopolymerized by the irradiation with the laser light and is thereby given a higher refractive index to form an optical coupling path 42. Subsequently the medium is stabilized by irradiation with ultraviolet rays for 10 minutes.

With the optical coupling device 4 wherein the coupling path 42 has a high refractive index than the surrounding portion, the light propagating through the optical fiber and emerging from one end thereof is totally reflected from the boundary plane of the path 42 and is caused to almost wholly impinge on the element 6, hence a very high optical coupling efficiency is obtained. This coupling efficiency remains almost constant even if the medium contracts or expands with changes in temperature. A signal wire 64 is bonded to the photoconductive surface of the chip 61. The distance between the photoconductive surface of the element 6 and the opposed end of the fiber 51 can be made long enough to fully accommodate the wire 64.

Figure 7:
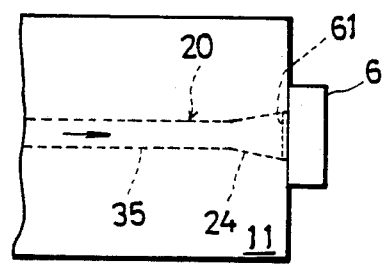
FIG. 7 shows optical coupling between a slab-type optical waveguide and a photoconductive element.

FIG. 7 shows a modification wherein an optical waveguide 20 like the one shown in FIG. 1 is optically coupled to a photoconductive element 6. A flaring optical coupling path 24 is formed in the same manner as in the case of FIG. 6. Alternatively, the path 24 may be formed by forming a flaring end portion by masking and irradiation with light in the same manner as shown in FIG. 2 and thereafter propagating light through the waveguide 20 to effect accelerated polymerization of the monomer.

Figure 8:
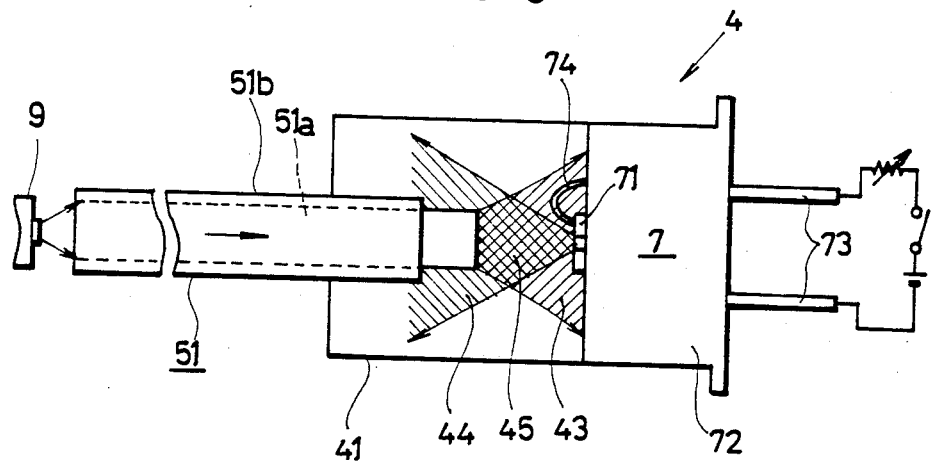
FIG. 8 shows an embodiment for optically coupling an optical fiber to a light-emitting element.

FIG. 8 shows another embodiment of the invention. The illustrated optical coupling device 4 is adapted to optically couple an optical fiber 51 to a light-emitting element 7, such as a light-emitting diode. The element 7 includes a light-emitting diode chip 71 slightly projecting from the upper end of a stem or mount 72. The diode 7 has pins 73 connected to a power supply via a switch and a current limiting resistor. As is the case with the embodiment of FIG. 6, one end of the optical fiber 51 and the light-emitting surface of the diode 7 are spaced apart by a predetermined distance, and the same optical medium 41 as above is filled in the space. The chip 71 of the light-emitting element 7 has bonded thereto a wire 74 for passing drive current.

When light is introduced into the other end of the fiber 51 from a He-Ne laser or light-emitting diode 9 in this case, the light emerges and spreads out from one end of the fiber. The emergent light irradiates a range covering the light-emitting surface of the diode 7 to photopolymerize the monomer in the portion 43 through which the light has passed. Next, the diode 7 is driven. The light emitted by the diode 7 also spreads out and advances toward one end of the fiber 51, similarly photopolymerizing the monomer in the portion 44 through which the light has passed. In this way, irradiation through the fiber 51 and irradiation by the diode 7 are alternately repeated ten times per second and continued for 10 minutes, whereby the refractive index of the portions 43 and 44 is increased progressively, with the result that the overlap 45 of the two portions 43 and 44 has the highest refractive index. The overlap 45 of the highest refractive index provides an optical coupling path.

With the optical coupling device 4 thus made, the light emitted by the element 7 is led through the path 45 having a higher refractive index than the surrounding portion and almost entirely introduced into the core 51a of the fiber 51 to realize highly efficient optical coupling.

Figure 9:
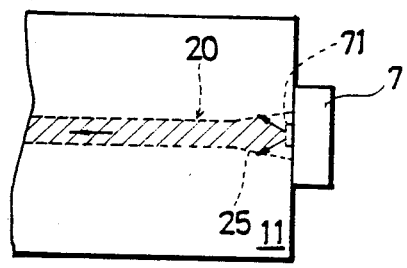
FIG. 9 shows optical coupling between a slab-type optical waveguide and a light-emitting element.

FIG. 9 shows a modified optical coupling device wherein an optical waveguide 20 is coupled to a light-emitting element 7. The waveguide 20 is formed by masking and irradiation with light in an optical medium 11 to which the element can be physically bonded. The waveguide 20 has a flaring end portion 25, and the light-emitting element 7 has its light-emitting portion positioned approximately at the center of the end portion 25. When the element 7 is driven, the light emerging from the element 7 travels through the waveguide 20 while spreading over the end portion 25. The portion irradiated with light is given an increased refractive index, whereby the same optical coupling path as shown in FIG. 5 is formed.

Figure 10:
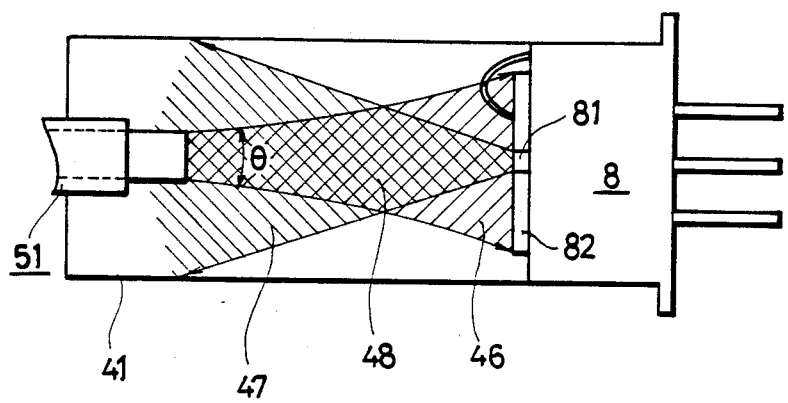
FIG. 10 shows an embodiment for optically coupling an optical fiber to a semiconductor element having both functions of emitting light and receiving light.

FIG. 10 shows another modified optical coupling device 4 wherein an optical fiber 51 is optically coupled to a semiconductor element 8 having both functions of emitting light and receiving light. The semiconductor element 8 has a small circular light-emitting portion 81 in its center and a photoconductive portion 82 surrounding the portion 81 and having a circular outer periphery. The semiconductor element 8 can be formed monolithically in a single chip, or the light-emitting element and the photoconductive element can be arranged in hybrid combination. The optical coupling device 4 can be construed as being a combination of the device of FIG. 6 and the one shown in FIG. 8.

Light is projected from the fiber 51 onto the element 8 through such a spreading angle $\theta$ as to exactly irradiate the photoconductive portion 82, whereby the portion 46 through which the light has passed is given an increased refractive index as already stated. The light emitted by the portion 81 when it is driven propagates toward one end of the optical fiber 51 while spreading out to increase the refractive index of a portion 47. The irradiation with the light from the fiber 51 and the irradiation with the light from the light-emitting portion 81 are repeated in a irradiation time ratio of 2:1 with a frequency of 10 times per second for 10 minutes, whereby the overlap 48 of the two portions 46 and 47 is made to have the highest refractive index. The portion 46 has a lower refractive index, and the refractive index of the portion 47 is lower than that of the portion 46.

Accordingly the light emitted by the light-emitting portion enters the fiber 51 through the portion 48, while the light emerging from the fiber 51 impinges on the photoconductive portion 82 only through the portions 48 and 46, whereby bidirectional optical coupling is realized with high efficiency.

What is claimed is:

1. A device for optically coupling an optical fiber to a semiconductor element, one end of the optical fiber being opposed to one surface of the semiconductor element, the device comprising an optical medium filling the space between said one end of the optical fiber and said one surface of the semiconductor element and containing a monomer polymerizable by being irradiated with light to give a polymer having a higher refractive index than the monomer, and an optical coupling path formed between said one end of the optical fiber and said one surface of the semiconductor element by the monomer being photopolymerized with light emerging from at least one of the optical fiber and the semiconductor element through the optical medium to the other.

2. A device as defined in claim 1 wherein the semiconductor element is a photoconductive element, and the emergent light is projected from said one end of the optical fiber toward the photoconductive surface of the photoconductive element and spread out through a predetermined angle for the light to exactly irradiate the photoconductive surface of the photoconductive element.

3. A device as defined in claim 1 wherein the semiconductor element is a light-emitting element, and the optical coupling path is formed by irradiation with light emerging from the optical fiber toward a region including the light-emitting surface of the light-emitting element and by irradiation with light emitted by the light-emitting element toward said one end of the optical fiber when the element is driven.

4. A device as defined in claim 1 wherein the semiconductor element has both functions of emitting light and receiving light, and the optical coupling path is formed by irradiation with light projected from the optical fiber toward the photoconductive surface of the element through a spreading angle for the light to exactly irradiate the photoconductive surface and by irradiation with light emitted by the light-emitting surface of the element toward said one end of the optical fiber when the element is driven.

5. A method of producing an optical coupling device comprising the steps of:
at least partly embedding two elements to be coupled optically in an optical medium containing a monomer polymerizable with irradiation with light to give a polymer having a higher refractive index than the monomer,
forming an optical waveguide of predetermined shape for optically coupling the two elements by masking the surface of the optical medium except for the portion where the optical waveguide is formed and partly polymerizing the monomer by irradiation with light onto the surface of the optical medium, and
projecting light from at least one of the elements onto the other element through the optical waveguide formed by being partly polymerized to effect accelerated polymerization of the monomer within the optical waveguide.

6. A method as defined in claim 5 wherein the optical waveguide has an end portion opposed to each of the elements and flaring widthwise toward the element.

7. A method as defined in claim 5 wherein each of the two elements is an optical fiber, light is propagated from one optical fiber toward the other optical fiber through the optical waveguide formed, and light is thereafter propagated from the other optical fiber toward said one optical fiber.

8. A method as defined in claim 5 wherein one of the elements is a light-emitting element, and the light-emitting element is driven to emit light toward the optical waveguide formed.

9. A method as defined in claim 5 wherein one of the elements is a photoconductive element, and light is cause to emerge from the optical waveguide formed toward the photoconductive surface of the photoconductive element through a spreading angle for the light to exactly irradiate the photoconductive surface.

10. A method of producing an optical coupling device comprising the steps of:
at least partly embedding two elements to be coupled optically in an optical medium containing a monomer polymerizable with irradiation with light to give a polymer having a higher refractive index than the monomer, and
projecting light from one of said at least two elements to another of said at least two elements through the optical medium to cause the monomer within the optical medium to be photopolymerized by the irradiation with the projected light to form an optical waveguide for optically coupling said two elements with each other.

11. A method as defined in claim 10 wherein one of said at least two elements is a light-emitting element, and said light-emitting element is driven to emit light toward another of said at least two elements.

12. A method as defined in claim 10 wherein said another element is a photoconductive element, having a photoconductive surface, and light is caused to emerge from said one element toward said photoconductive surface of said photoconductive element through a spreading angle, for the light to exactly irradiate said photoconductive surface.

13. A method as defined in claim 10 wherein one of said at least two elements is a semiconductor element having both functions of emitting light and receiving light, light is caused to emerge from another of said at least two elements toward a photoconductive surface of said semiconductor element through a spreading angle, for the light to exactly irradiate said photoconductive surface, and said semiconductor element is driven to emit light toward said another element.

* * * * *